(12) United States Patent
Cooper (10) Patent No.: US 10,907,476 B2
(45) Date of Patent: Feb. 2, 2021

(54) SHAFT ASSEMBLY (71) Applicant: ROLLS-ROYCE plc, London (GB)

(72) Inventor: Joseph B. Cooper, Bristol (GB)

(73) Assignee: Rolls-Royce plc, London (GB)

( * ) Notice: Subject to any disclaimer, the term of this patent is extended or adjusted under 35 U.S.C. 154(b) by 69 days.

(21) Appl. No.: 16/374,778

(22) Filed: Apr. 4, 2019

(65) Prior Publication Data
US 2019/0323353 A1 Oct. 24, 2019

(30) Foreign Application Priority Data

Apr. 20, 2018 (GB) .................................. 1806432.9

(51) Int. Cl.
| | | |
|---|---|---|
| *F01D 5/02* | (2006.01) | |
| *F02K 3/06* | (2006.01) | |
| *F16D 1/05* | (2006.01) | |

(52) U.S. Cl.
CPC ............... *F01D 5/026* (2013.01); *F02K 3/06* (2013.01); *F16D 1/05* (2013.01); *F05D 2220/323* (2013.01); *F05D 2240/60* (2013.01)

(58) Field of Classification Search
CPC . F01D 5/026; F01D 5/066; F02C 7/36; F02K 3/06; F16D 1/05; F05D 2220/323; F05D 2240/60; F05D 2230/64; F05D 2250/232; F05D 2250/311; F05D 2260/30
See application file for complete search history.

(56) References Cited

U.S. PATENT DOCUMENTS

| | | | |
|---|---|---|---|
| 2,515,303 A | 7/1945 | Isnard | |
| 3,718,957 A | 3/1973 | Shank | |
| 3,855,818 A * | 12/1974 | Hochreuter | ............... F16D 9/06 |
| | | | 464/33 |
| 4,254,854 A | 3/1981 | St. John | |

(Continued)

FOREIGN PATENT DOCUMENTS

| | | |
|---|---|---|
| GB | 2537613 | 10/2016 |
| JP | 2011033169 | 2/2011 |
| SU | 504 892 A1 | 2/1976 |

OTHER PUBLICATIONS

Great Britain search report dated Oct. 18, 2018, issued in GB Patent Application No. 1806432.9.

(Continued)

*Primary Examiner* — Igor Kershteyn
(74) *Attorney, Agent, or Firm* — Brinks Gilson & Lione (57) ABSTRACT

A shaft assembly for a gas turbine engine is provided. The shaft assembly comprises: a first shaft having an outer surface; a first coupling ring disposed around the outer surface of the first shaft, an inner surface of the first coupling ring being coupled to the outer surface of the first shaft; a second shaft having an inner surface; and a second coupling ring disposed around the inner surface of the second shaft, an outer surface of the second coupling ring being coupled to the inner surface of the second shaft, wherein an outer surface of the first coupling ring is configured to mate with an inner surface of the second coupling ring, such that concentricity of the first and second shafts is maintained at the shaft assembly by virtue of the mating of the first and second coupling rings. Methods of assembling and re-assembling a shaft assembly are also provided.

16 Claims, 6 Drawing Sheets

(56) References Cited

U.S. PATENT DOCUMENTS

| | | | | |
|---|---|---|---|---|
| 4,685,823 A | * | 8/1987 | Lopez | F16D 1/06 29/558 |
| 4,701,068 A | * | 10/1987 | Andrews | F16D 3/00 403/359.5 |
| 4,900,177 A | | 2/1990 | Ferguson | |
| 2016/0305490 A1 | * | 10/2016 | Rix | F16D 47/02 |
| 2019/0024755 A1 | * | 1/2019 | Gravina | F16H 1/46 |

OTHER PUBLICATIONS

Extended European Search Report, issued in EP Application No. 19164275.0, dated Sep. 20, 2019, pp. 1-7, European Patent Office, Munich, Germany.

\* cited by examiner

SHAFT ASSEMBLY

CROSS REFERENCE TO RELATED APPLICATIONS

This application is based upon and claims the benefit of priority from UK Patent Application No. GB 1806432.9, filed on 20 Apr. 2018, the entire contents of which are herein incorporated by reference.

BACKGROUND

Technical Field

The present disclosure relates to a shaft assembly for a gas turbine engine and is particularly, although not exclusively, concerned with a shaft assembly with improved maintainability.

Description of the Related Art

Gas turbine engines typically comprise a plurality of rotating components, such as core shafts and discs, e.g. for supporting rotor blades of the gas turbine engine, that are aligned concentrically with one another and rotate about a common axis during operation of the gas turbine engine.

In order to concentrically align the rotating components, the rotating components are often connected together such that an interference fit is formed between an outer surface of one of the rotating components and an inner surface of the other of the rotating components to form a spigot joint between the rotating components In order to form the interference fit, the rotating component comprising the inner surface forming part of the spigot joint is heated, such that a diameter of the inner surface is increased. The rotating components are then positioned appropriately relative to one another and the heated component is cooled so that the diameter of the inner surface reduces to form the interference fit.

By heating the rotating component during assembly, the interference fit can be formed without the interfacing surfaces of the rotating components being worn by the rotating components being moved axially relative to one another. However, if the rotating components are subsequently decoupled from one another, for example, during maintenance of the gas turbine engine, the interfering surfaces of the rotating components may be worn by the relative axial movement between the surfaces during decoupling.

SUMMARY

According to a first aspect there is provided a shaft assembly for a gas turbine engine, the shaft assembly comprising: a first shaft having an outer, e.g. radially outer, surface; a first coupling ring disposed around the outer, e.g. radially outer, surface of the first shaft, an inner, e.g. radially inner, surface of the first coupling ring being coupled to the outer, e.g. radially outer, surface of the first shaft; a second shaft having an inner, e.g. radially inner, surface; and a second coupling ring disposed around the inner, e.g. radially inner, surface of the second shaft, an outer, e.g. radially outer, surface of the second coupling ring being coupled to the inner, e.g. radially inner, surface of the second shaft, wherein an outer, e.g. radially outer, surface of the first coupling ring is configured to mate with an inner, e.g. radially inner, surface of the second coupling ring, such that concentricity of the first and second shafts is maintained, e.g. such that axes of the first and second shafts may be substantially aligned, at the shaft assembly, by virtue of the mating of the first and second coupling rings. In other words, a spigot joint may be formed between the first and second shafts by the first and second coupling rings.

The term "shaft" is used within this specification to refer rotating components in general, including but not limited to: core engine shafts, gearbox shafts, compressor shafts, turbine shafts, fan shafts, and discs, such as bladed discs and discs for supporting blades, e.g. fan blades, compressor blades and turbine blades, for a gas turbine engine.

The first shaft may comprise an axial abutment face. One or both of first axial end faces of the first and second coupling rings may be configured to abut the axial abutment face of the first shaft when the first and second coupling rings mate.

For example, the first axial end faces of both of the first and second coupling rings may abut the axial abutment face of the first shaft when the first and second coupling rings mate.

The axial abutment face may be formed by a step provided on the first shaft. The axial end face may thereby align the first and second coupling rings in an axial direction when the shaft assembly is assembled, e.g. when the outer surface of the first coupling ring mates with the inner surface of the second coupling ring.

The second shaft may comprise an axial abutment face. One or both of second axial ends faces of the first and second coupling rings may abut the axial abutment face of the second shaft when the first and second coupling rings mate, e.g. when the shaft assembly is assembled.

For example, the second axial end face of the second coupling ring may abut the axial abutment face of the second shaft when the first and second coupling rings mate and the second axial end face of the first coupling ring may not abut the axial abutment face of the second shaft.

The second axial end faces of the first and second coupling rings may be opposite, e.g. axially opposite, the respective first axial end faces of the first and second coupling rings.

In one arrangement, the first axial end face of the first coupling ring may be configured to abut the axial abutment face of the first shaft and the second axial end face of the second coupling ring may be configured to abut the axial abutment face of the second shaft, e.g. when the shaft assembly is assembled.

The inner surface of the first coupling ring and/or the outer surface of the second coupling ring may be substantially radial.

In other words, the radii of the inner surface of the first coupling ring and/or the outer surface of the second coupling ring may be substantially constant respectively. Alternatively, the inner surface of the first coupling ring any the outer surface of the second coupling ring may be any other suitable shapes that correspond to the shapes of the outer surface of the first shaft and the inner surface of the second shaft respectively.

The outer surface of the first coupling ring and the inner surface of the second coupling ring may be conical. The shape, e.g. change in diameter over the axial length, of the inner surface of the second coupling ring may correspond to the shape of the outer surface of the first coupling ring.

Alternatively, the outer surfaces of the first coupling ring and the inner surface of the second coupling ring may be radial, e.g. having constant radii over the surfaces.

When the first coupling ring and the second coupling ring are mated together, the first and second coupling rings may together form a ring of constant thickness between the first and second shafts.

The outer surface of the first coupling ring may be at a maximum diameter, e.g. relative to the axis of the first shaft, at the first axial end face of first coupling ring that may abut the axial abutment face of the first shaft.

Correspondingly, the inner surface of the second coupling ring may be at a maximum diameter at the first axial end face of second coupling ring that may abut the axial abutment face of the first shaft.

The outer surface of the first coupling ring may be at a minimum diameter at the second axial end face of first coupling ring that may abut the axial abutment face of the second shaft.

Correspondingly, the inner surface of the second coupling ring may be at a minimum diameter at the second axial end face of second coupling ring that may abut the axial abutment face of the second shaft.

The first and second coupling rings may be configured to form an interference fit between one another when mated together.

The outer surface of the first coupling ring and the inner surface of the second coupling ring may be hardened surfaces. For example, the surfaces may be hardened using a hardening process and/or coated with a hard material, e.g. harder than the base material of the first and second coupling rings respectively. The surfaces of the first and second coupling rings may be hardened such that the surfaces are substantially undamaged following mating and subsequent bringing apart of the surfaces.

The inner surface of the second coupling ring may be harder than the outer surface of the first coupling ring. For example, the second coupling ring may be made from a harder material than the first coupling ring. Additionally or alternatively, the inner surface of the second coupling ring may be hardened more than the outer surface of the first coupling ring, e.g. using a material or surface hardening process. The outer surface of the first coupling ring may be worn preferentially to the inner surface of the second coupling ring.

One or both of the first and the second shafts may comprise an axial groove aligned, e.g. axially aligned, with the first and second coupling rings respectively.

The respective grooves may extend over the axial lengths of the respective coupling rings. The grooves may be for providing a clearance between a cutting tool cutting through the first and second coupling rings and the first and second shafts respectively.

The shaft assembly may further comprise an axial retainer, e.g. a shaft nut, configured to retain the first and second shafts relative to one another in an axial direction. For example, the axial retainer may apply an axial clamping force between the first and second shafts. The axial retainer may retain the first and second shafts such that the first axial end faces of the first and second coupling rings abut the axial abutment face of the first shaft. Additionally or alternatively, the axial retainer may retain the first and second shafts such that the second axial end faces of the first and second coupling rings abut the axial abutment face of the second shaft.

The axial retainer may be adjustable in order to control the relative axial positions of the first and second shafts.

The first shaft may be a rotor shaft for a gas turbine engine and the second shaft may be a rotor shaft, a blade disc or a bladed disc for a gas turbine engine. For example, the first shaft may be a core engine shaft and the second shaft may be a shaft of a gear box assembly, e.g. a fan gear box assembly. Alternatively, the first shaft may be a shaft of a gear box assembly, or a fan assembly and the second shaft may be a further shaft of the fan assembly.

According to another aspect, there is provided a shaft assembly for a gas turbine engine, the shaft assembly comprising; a first shaft having an outer surface; a second shaft having an inner surface, wherein a portion of the first shaft is received inside of the inner surface of the second shaft; an expandable coupling ring arranged between the outer surface of the first shaft and the inner surface of the second shaft, wherein the expandable coupling ring is configured to selectively expand in a radial direction in order to couple to the first and second shafts together such that concentricity of the first and second shafts is maintained at the shaft assembly by the expandable coupling ring, e.g. such that axes of the first and second shafts are substantially aligned.

The assembly may further comprise an axial retainer configured to apply an axial force, e.g. a compressive force, to the expandable coupling ring. The expandable coupling ring may be configured to expand in the radial direction under the action of the axial force.

The expandable coupling ring may be arranged between axial abutment faces formed on the first and second shafts. The axial force may be applied to the expandable coupling ring by the axial abutment face, for example, the axial retainer may adjust the relative axial locations of the first and second shafts in order to apply the axial force to the expandable coupling ring.

The expandable coupling ring may comprise resilient side wall portions, which resiliently deform under the axial load in order to change the radial height of the expandable coupling ring.

According to another aspect there is provided a method of assembling a shaft assembly, the shaft assembly comprising:

a first shaft having an outer surface;

a second shaft having an inner surface, wherein the method comprises coupling an inner surface of a first coupling ring to the outer surface of the first shaft such that the first coupling ring is disposed around the outer surface of the first shaft;

coupling an outer surface of a second coupling ring to the inner surface of the second shaft such that the second coupling ring is disposed around the inner surface of the second shaft; and mating an outer surface of the first coupling ring with an inner surface of the second coupling ring such that concentricity of the first and second shafts is maintained at the shaft assembly, e.g. such that axes of the first and second shafts are substantially aligned. In other words, mating of the first and second coupling rings may form a spigot joint between the first and second shafts.

The step of mating the outer surface of the first coupling ring with the inner surface of the second coupling ring may comprise forming an interference fit between the outer surface of the first coupling ring and the inner surface of the second coupling ring.

The step of mating the outer surface of the first coupling ring with the inner surface of the second coupling ring may comprise heating the second coupling ring such that a diameter of the inner surface of the second coupling ring increases. The step of mating the outer surface of the first coupling ring with the inner surface of the second coupling ring may comprise positioning the second coupling ring about the first coupling ring The step of mating the outer surface of the first coupling ring with the inner surface of the second coupling ring may further comprise cooling the second coupling ring such that a diameter of the inner surface of the second coupling ring reduces to mate with the outer surface of the first coupling ring.

The outer surface of the first coupling ring and the inner surface of the second coupling ring may be conical, e.g. such that a diameter of the outer surface varies in an axial direction of the first coupling ring. The inner surface of the second coupling ring may correspond to the outer surface of the first coupling ring. The step of mating the outer surface of the first coupling ring with the inner surface of the second coupling ring may comprise displacing the first and second shafts relative to one another in an axial direction, e.g. by applying an axial clamping force between the first and second shafts. The first and second shafts may be displaced axially relative to one another until the first and second coupling rings are substantially axially aligned.

According to another aspect, there is provided a method of re-assembling a shaft assembly, wherein the shaft assembly comprises:

a first shaft having an outer surface;

a first coupling ring disposed around the outer surface of the first shaft, wherein an inner surface of the first coupling ring is coupled to the outer surface of the first shaft;

a second shaft having an inner surface; and a second coupling ring disposed around the inner surface of the second shaft, wherein an outer surface of the second coupling ring is coupled to the inner surface of the second shaft, and wherein an outer surface of the first coupling ring is mated with an inner surface of the second coupling ring to form a joint between the first and second shafts, wherein the method comprises:

disconnecting the joint between the first and second shafts by bringing the outer surface of the first coupling ring out of contact with the inner surface of the second coupling ring;

replacing one or both of the first coupling ring and the second coupling ring; and reconnecting the first and second shafts such that the outer surface of the first coupling ring is mated with the inner surface of the second coupling ring, e.g. to form a spigot joint between the first and second shafts.

The first and/or second coupling rings may be replaced with first and/or second coupling ring that have not previously been provided within a shaft assembly, or with first and/or second coupling rings that have previously been removed from the shaft assembly, or another shaft assembly, and repaired or reworked.

One or more of the first and the second shafts may comprise an axial groove aligned with the first and second coupling rings. The step of replacing one or both of the first coupling ring and the second coupling ring may comprise cutting through the first and second coupling rings being replaced. A cutting tool used to cut through the one or more of the first and second coupling rings may pass though the axial groove during the cutting operation, e.g. such that a clearance may be provided between the cutting tool and the material of the first and second shafts.

A gas turbine engine for an aircraft may comprise: an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft, wherein the gas turbine engine may comprise the above-mentioned shaft assembly.

The first shaft may be the core shaft or a shaft of the fan or gearbox, and the second shaft may be a compressor, turbine or fan disc, or another shaft of the engine core, fan or gearbox. For example, one or more of the above mentioned shaft assemblies may be operatively disposed between the engine core and the gearbox and/or between the gearbox and the fan.

The turbine may be a first turbine, the compressor may be a first compressor, and the core shaft may be a first core shaft. The engine core may further comprise a second turbine, a second compressor, and/or a second core shaft connecting the second turbine to the second compressor; and the second turbine, second compressor, and second core shaft may be arranged to rotate at a higher rotational speed than the first core shaft.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Figure 1:
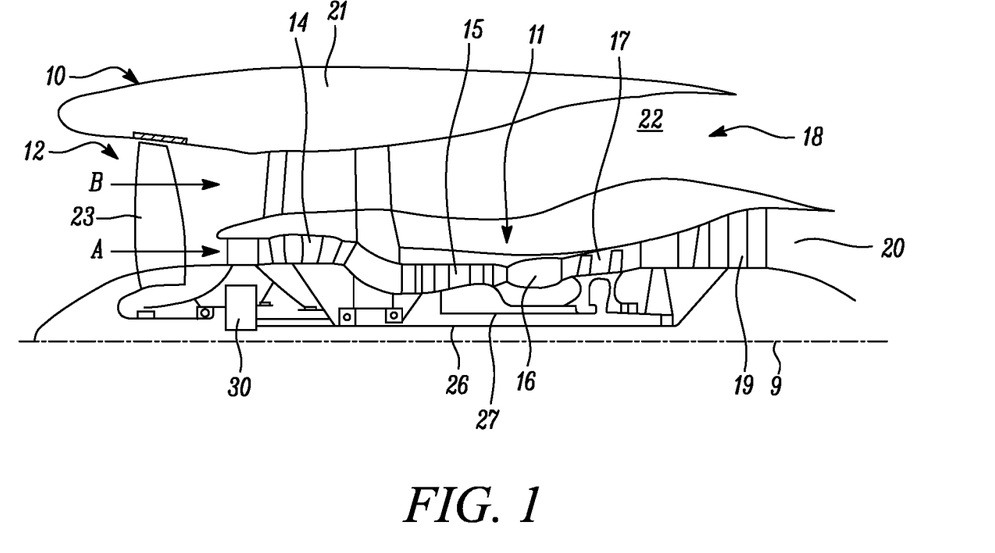
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
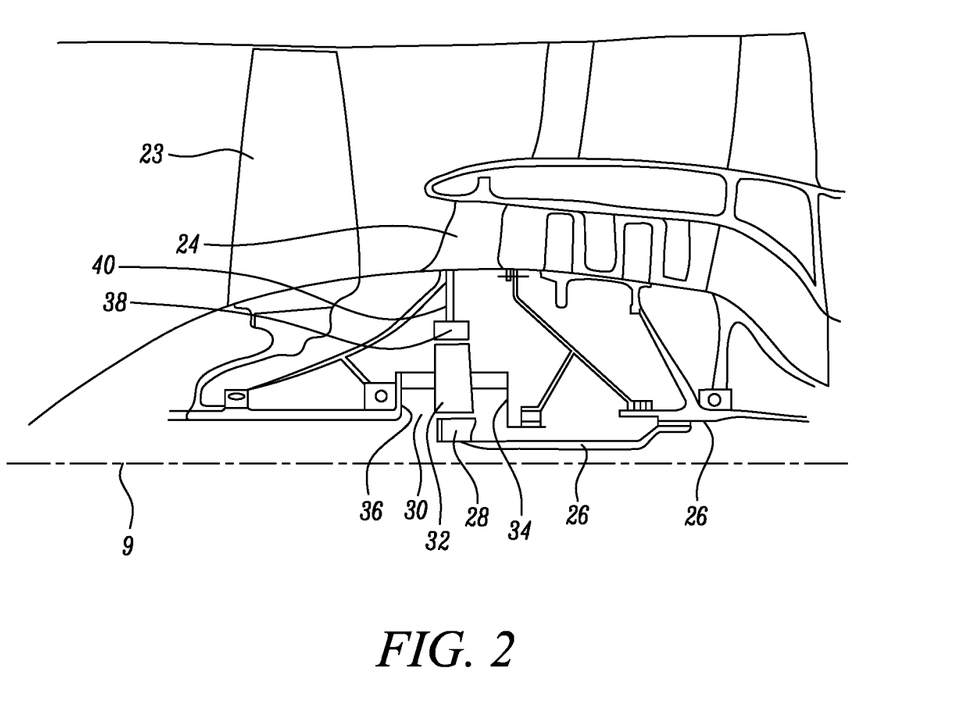
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
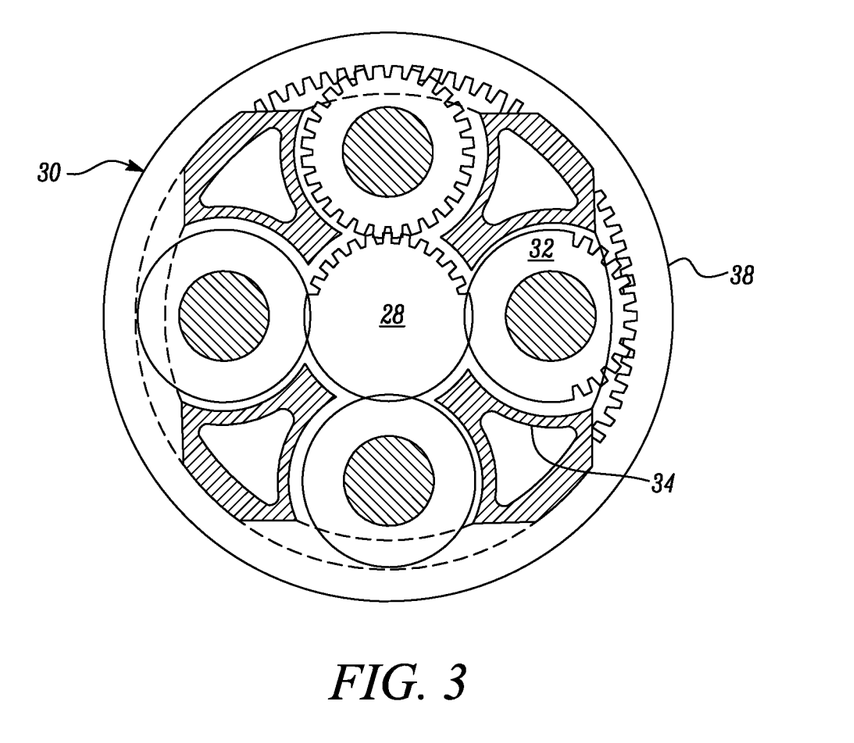
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
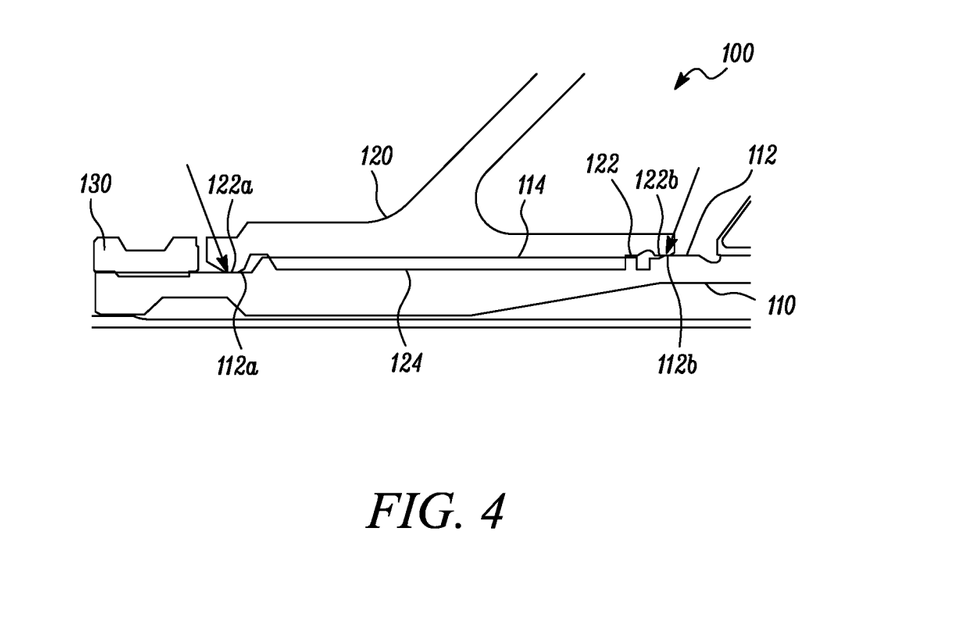
FIG. 4 is a partial sectional view of a spigot joint between rotating components.

With reference to FIG. 4, shafts of the gas turbine engine 10, or any other gas turbine engine, may be coupled together to form a shaft assembly 100. The shaft assembly comprises a first shaft 110, such as a fan shaft, and a second shaft 120, such as a fan disc, on which fan blades of the fan are supported.

The first shaft 110 comprises an outer surface 112. At least a portion of the second shaft 120 is hollow and comprises an inner surface 122. A portion of the first shaft 110 is received inside of the inner surface 122 of the second shaft, such that the outer surface 112 of the first shaft opposes the inner surface 122 of the second shaft 120.

The first and second shafts 110, 120 may comprise respective spline coupling portions 114, 124, which are configured to meshingly engage when the first and second shafts 112, 122 are assembled together in order to improve the transfer of torque between the first and second shafts 110, 120.

It is desirable to maintain a high level of concentricity between the first and second shafts 110, 120 at the shaft assembly 100 during operation of the gas turbine engine. The first shaft 110 comprises first and second spigot surface portions 112a, 112b forming parts of the outer surface 112 of the first shaft 110. The second shaft 120 comprises corresponding first and second spigot surface potions 122a, 122b forming parts of the inner surface 122 of the second shaft 120.

As depicted in FIG. 4, the first and second spigot surface portions 112a, 122a, 112b, 122b are configured such that, when the shaft assembly is assembled, the first spigot surface portion 112a of the first shaft 110 aligns, e.g. axially aligns, and mates with the first spigot surface portion 122a of the second shaft 120, and the second spigot surface portion 112b of the first shaft 110 aligns and mates with the second spigot surface portion 122b of the second shaft 120.

The corresponding first and second spigot surface portions 112a, 122a, 112b, 122b are configured to form interference fits between the first and second shafts 110, 120. In this way, concentricity of the first and second shafts 110, 120 is controlled at the shaft assembly 100.

As depicted in FIG. 4, the first spigot surface portions 112a, 122a and the second spigot surface portions 112b, 122b may be spaced apart along the length, e.g. the axial length, of the shaft assembly 100, such that concentricity of the first and second shafts 110, 120 is maintained over a length of the shaft assembly 100. For example, the first spigot surface portions 112a, 122a may be provided at or close to a first axial end of the second shaft and the second spigot surface portions 112b, 122b may be provided at or close to a second axial end of the second shaft 120 such that concentricity of the first and second shafts 110, 120 is maintained over the length of the second shaft.

The shaft assembly 100 may further comprise an axial retainer 130 configured to restrict relative axial movements of the first and second shafts 110, 120.

In order to assemble the shaft assembly 100, the second shaft 120 may be heated, such that the material of the second shaft expands and the diameter of the inner surface 122, including the first and second spigot surfaces 122a, 122b, increases.

The first shaft 110 is then assembled with the second shaft 120, such that the first and second spigot surface portions 112a, 112b of the first shaft are aligned, e.g. axially aligned, with the first and second spigot surface portions 122a, 122b of the second shaft respectively.

The second shaft 120 is then cooled, such that the corresponding spigot surface portions of the first and second shafts mate with one other.

When the first and second shafts 110, 120 are subsequently disconnected from one another, the first and second shafts are displaced axially relative to one another, such that the first and second spigot surface portions 112a, 122a, 112b, 122b are no longer in contact. As described above, disconnecting spigot joints in this way can cause the spigot surface portions to become worn. If the surfaces become worn, it may be desirable to repair or rework the surfaces before reassembling the shaft assembly, which be expensive and time consuming With reference to FIGS. 5a and 5b, in order to prevent wear to interfacing surfaces of the shafts, shafts of a gas turbine engine may be assembled within a shaft assembly 500.

Figure 5A:
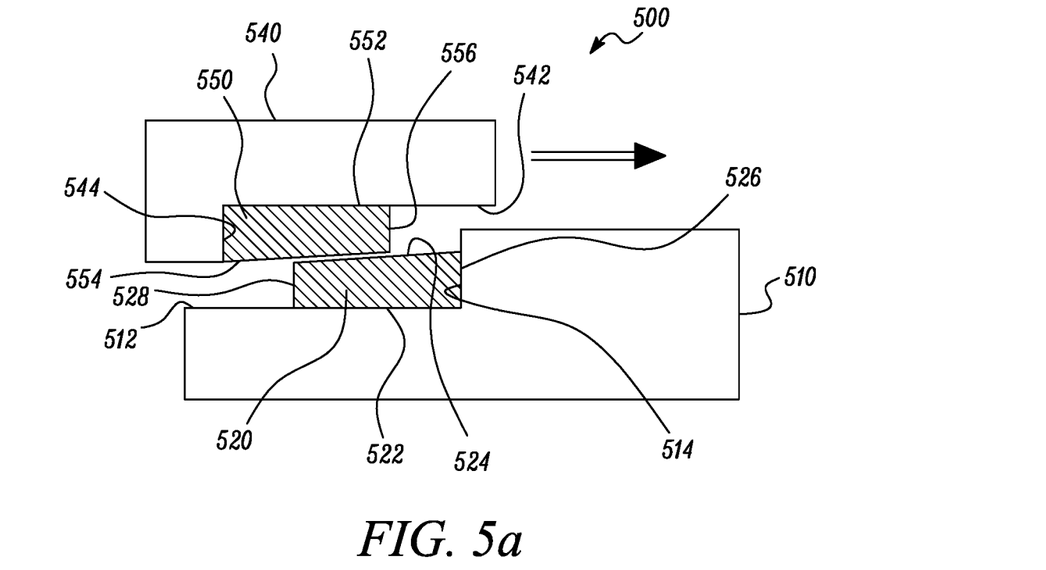
FIG. 5a is a schematic sectional view of a shaft assembly in a disconnected configuration.
Figure 5B:
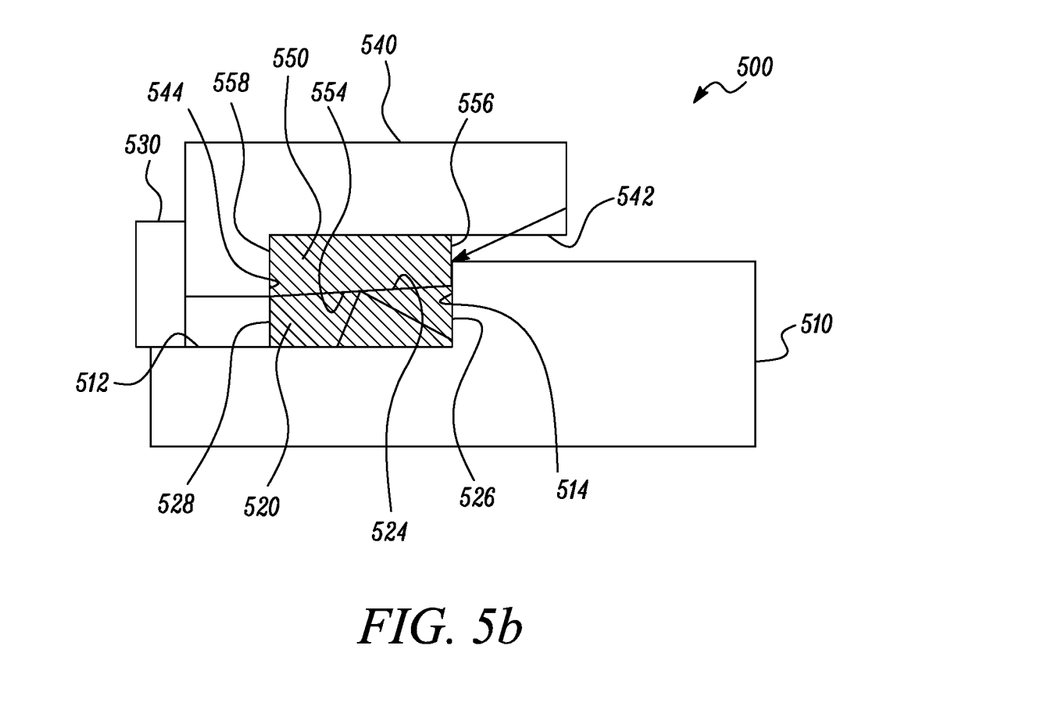
FIG. 5b is a schematic sectional view of the shaft assembly in a connected configuration.

The shaft assembly 500 comprises a first shaft 510 and a second shaft 540. The first shaft 510 may be a rotor shaft for a gas turbine engine and the second shaft 540 may be a rotor shaft, a blade disc or a bladed disc for a gas turbine engine. For example, the first shaft 510 may be a core engine shaft and the second shaft 540 may be a shaft of a fan, or a compressor or turbine of the core engine. Alternatively, the first and/or second shafts may be shafts of a gearbox assembly, e.g. a fan gearbox assembly. For example, the first shaft 510 may be a shaft of the gearbox assembly and the second shaft 540 may comprise a further shaft of the fan assembly. Alternatively, the first shaft 510 may be a core engine shaft and the second shaft 540 may be a shaft of the gearbox assembly.

The first shaft 510 is similar to the first shaft 110 and comprises an outer, e.g. radially outer, surface 512. The second shaft 540 is similar to the second shaft 120 and is hollow, or comprises a hollow portion, having an inner, e.g. radially inner, surface 542. A diameter of the inner surface 542 is greater than a diameter of the outer surface 512 so that, when the shaft assembly 500 is assembled, the first shaft 510 can be at least partially received inside of the inner surface 542 of the second shaft 540.

The shaft assembly 500 further comprises a first coupling ring 520. The first coupling ring is disposed around the outer surface 512 of the first shaft 510. An inner, e.g. radially inner, surface 522 of the first coupling ring is coupled to the outer surface 512 of the first shaft 510. For example, an interference fit may be formed between the first shaft 510 and the first coupling ring 520.

As depicted, an outer, e.g. radially outer, surface 524 of the first coupling ring 520 may be conical, such that a diameter of the outer surface 524 varies along the length, e.g. the axial length, of the first coupling ring 520. For example, the diameter of the outer surface 524 may increase linearly from a minimum diameter to a maximum diameter along the length of the first coupling ring 520. Alternatively, in other arrangements, the outer surface 524 may be substantially radial, e.g. such that the outer surface is defined at a constant radius relative to a central axis of the first coupling ring 520.

The shaft assembly 500 further comprises a second coupling ring 550. The second coupling ring is disposed around, e.g. inside of, the inner surface 542 of the second shaft 540. An outer, e.g. radially outer, surface 552 of the second coupling ring 550 is coupled to the inner surface 542 of the second shaft 540, e.g. using an interference fit.

An inner, e.g. radially inner, surface 554 of the second coupling ring 550 may be conical, such that a diameter of the inner surface 554 varies along the length, e.g. the axial length, of the second coupling ring 550.

Alternatively, the inner surface 554 of the second coupling ring 550 may be substantially radial. In other words, the inner surface 554 may be defined at a constant radius relative to a central axis of the second coupling ring 550.

As depicted in FIGS. 5a and 5b, the shape of the inner surface 554 of the second coupling ring 550 is configured to correspond with the shape of the outer surface 524 of the first coupling ring 520. For example, the minimum and maximum diameters of the inner surface 554 and the outer surface 524 may be similar. Additionally, the way in which the diameters of the inner surface 554 and the outer surface 524 vary along the lengths of the first and second coupling rings 520, 550 may be the same.

The first and second coupling rings 520, 550 are thereby configured such that the inner surface 554 of the second coupling ring 550 and the outer surface 524 of the first coupling ring 520 can be mated together when the shaft assembly 500 is assembled, as depicted in FIG. 5b.

The first and second coupling rings 520, 550 may be configured such that, when the inner surface 554 of the second coupling ring 550 and the outer surface 524 of the first coupling ring 520 are mated together, an interference fit is formed between the first and second coupling rings. In this way, the first and second shafts 510, 540 may be concentrically aligned within the shaft assembly 500 by virtue of the mating of the first and second coupling rings 520, 550. In other words, the first and second coupling rings 520, 550 may form a spigot joint between the first and second shafts 510, 540.

When the inner surface 554 of the second coupling ring 550 and the outer surface 524 of the first coupling ring 520 are mated together, the first and second coupling rings 520, 550 together form a ring of substantially constant thickness over the axial length of the first and second coupling rings 520, 550.

In some arrangements, the first and second coupling rings 520, 550 may also be configured to improve the transfer of torque between the first and second shafts. For example, splines may be formed on the inner and outer surfaces of the first and second coupling rings, which may meshingly engage with each other and with splines formed on the outer and inner surfaces of the first and second shafts respectively.

Alternatively, a spline may be formed on the first shaft 510 in a location away, e.g. axially offset, from the first coupling ring 520, which may meshingly engage with a spline formed on the second shaft in a location away from the second coupling ring 550 in order to improve transfer of torque between the first and second shafts 510, 540.

As shown in FIG. 5b, when the inner surface 554 of the second coupling ring 550 and the outer surface 524 of the first coupling ring 520 are mated together, first axial ends faces 526, 556 of the first and second coupling rings may be aligned, e.g. in an axial direction of the shaft assembly 500. Additionally or alternatively, second axial ends faces 528, 558 of the first and second coupling rings 520, 550, formed at opposite ends of the respective coupling rings to the first axial end faces 526, 556, may be aligned, e.g. in the axial direction.

The first shaft 510 may comprise an axial abutment face 514. The axial abutment face 514 may be a shoulder of a step formed on the outer surface 512 of the first shaft 510. The first coupling ring 520 may be assembled onto the first shaft 510 such that the first axial end face 526 of the first coupling ring 520 abuts the axial abutment face 514 of the first shaft 510.

Similarly, the second shaft 540 may comprise an axial abutment face 544. The axial abutment face 544 may be a shoulder of a step formed on the inner surface of the second shaft 540. The second coupling ring 550 may be assembled onto the second shaft 530 such that the second axial end face 558 of the second coupling ring abuts the axial abutment face.

The diameter of the outer surface 524 of the first coupling ring 520 may be at its maximum value at the first axial end face 526 of the first coupling ring 520 that abuts the axial abutment face 514 of the first shaft 510. The diameter of the outer surface 524 of the first coupling ring 520 may be at its minimum value at a second axial end face 528 of the first coupling ring 528.

Similarly, the diameter of the inner surface 554 of the second coupling ring 550 may be at its minimum value at the second axial end face 558 of the second coupling ring that abuts the axial abutment face 544 of the second shaft 540. The diameter of the inner surface 554 of the second coupling ring 550 may be at its maximum value at the first axial end face 556 of the second coupling ring 550.

As depicted, the axial abutment face 514 of the first shaft 510 may have a greater outer diameter than the outer surface 524 of the first coupling ring 520, such that a portion 514a of the axial abutment face 514 extends radially outward relative to the first coupling ring outer surface 524. When the shaft assembly 500 is assembled, as depicted in FIG. 5b, the first and second shafts 510, 540 may be moved relative to one another, e.g. axially, such that the first axial end face 556 of the second coupling ring 550 abuts the axial abutment face 514 of the first shaft 510, e.g. the portion 514a of the axial abutment face radially outward from the first coupling ring 520. The first and second coupling rings 520, 550 are thereby aligned within the shaft assembly 500 by the axial abutment face 514.

Additionally or alternatively, when the shaft assembly 500 is assembled, the second axial end face 528 of the first coupling ring 520 may abut the axial abutment face 544 of the second shaft 540 in order to axially align the first and second coupling rings 520, 550. The axial abutment face 544 of the second shaft 540 may have a smaller inner diameter than the minimum diameter of the inner surface 554 of the second coupling ring 550 and the second axial end face 528 of the first coupling ring may abut a portion of the axial abutment face 544 of the second shaft 540 provided radially inward of the second coupling ring 550.

The shaft assembly 500 further comprises an axial retainer 530 configured to restrict axial movements of the first and second shafts 510, 540. The axial retainer 530 may be arranged to apply axial forces to the first and second shafts which act to force the second coupling ring 550 against the axial abutment face 514 of the first shaft and/or the first coupling ring 520 against the axial abutment face 544 of the second shaft 540, in order to restrict relative axial movements of the shafts 510, 540. For example, an inner surface of the axial retainer 530 may couple to the first shaft 510 and an axial end face of the axial retainer 530 may abut an axial end face of the second shaft 540.

FIGS. 5a and 5b depict a shaft assembly 500 in which a single first coupling ring 520 is provided on the first shaft 510, and a single second coupling ring 550 is provided on the second shaft 540, such that a spigot joint is formed between the first and second shafts in one location. However it is equally envisaged, that two or more first coupling rings may be provided on the first shaft 510 and may be configured to mate with two or more corresponding second coupling rings provided on the second shaft 540. For example, first and second coupling rings may be provided in the locations in which the first and second spigot surface portions 112a, 122a, 112b, 122b are provided in the shaft assemble 100, in order to concentrically align the first and second shafts along the lengths of the shaft assembly.

Figure 6:
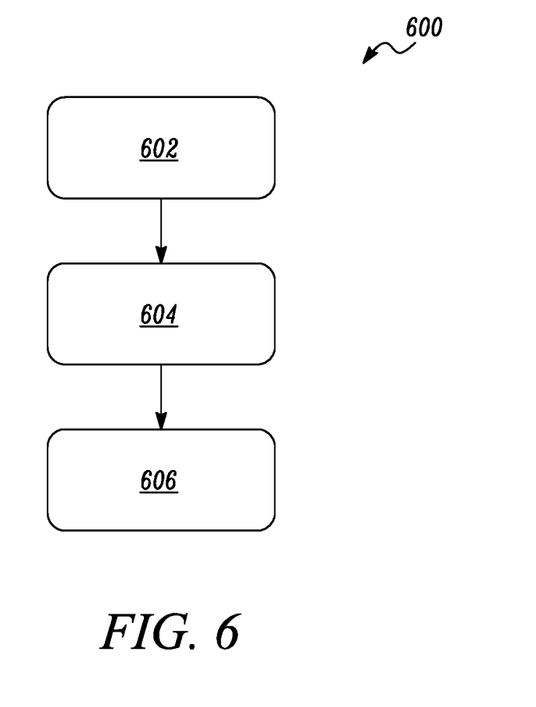
FIG. 6 is a flow chart depicting a method of assembling a shaft assembly.

With reference to FIG. 6, the shaft assembly 500 may be assembled using a method 600. The method 600 comprises a first step 602 in which the inner surface 522 of the first coupling ring 520 is coupled to the outer surface 512 of the first shaft 510 such that the first coupling ring 520 is disposed around the outer surface 512 of the first shaft 510.

The first coupling ring 520 may be coupled to the first shaft 510 by heating the first coupling ring 520 so that the diameter of the inner surface 522 of the first coupling ring 520 increases, e.g. to a diameter greater than the outer surface 512 of the first shaft 510. Additionally or alternatively, the first shaft 510 may be cooled, such that the diameter of the outer surface 512 of the first shaft 510 reduces. The first coupling ring 520 may then be positioned on to the first shaft 510 in the desired axial position. The first coupling ring 520 may then be cooled or allowed to cool so that the diameter of the first coupling ring 520 reduces and/or the first shaft 510 may be warmed so that the diameter of the first shaft 510 increases, such that the first coupling ring 520 becomes coupled to the first shaft 510. In this way, the first coupling ring 520 may be assembled onto the first shaft 510 without wear to the interfacing surfaces of the first coupling ring 520 and the first shaft 510.

In a second step 604, the outer surface 552 of the second coupling ring 550 is coupled to the inner surface 542 of the second shaft 540 such that the second coupling ring 550 is disposed around the inner surface 542 of the second shaft 540.

The second coupling ring 550 may be coupled to the second shaft 540 in a similar way to how the first coupling ring 520 is coupled to the first shaft 514. In particular, the second shaft 540 may be heated and/or the second coupling ring 550 may be cooled, such that the diameter of the inner surface 542 of the second shaft 540 becomes greater than the diameter of the outer surface 552 of the second coupling ring 550. The second coupling ring 550 may then be positioned, e.g. in a desired axial position, relative to the second shaft 540, before the components are returned to the same temperature, to couple the components together.

The method 600 further comprises a third step 606, in which the outer surface 524 of the first coupling ring 520 is mated with the inner surface 554 of the second coupling ring 550. A spigot joint is thereby formed between the first and second shafts 510, 540 and the first and second shafts are concentrically aligned, e.g. such that axes of the first and second shafts are substantially aligned.

As described above, the shapes of the outer surface 524 of the first coupling ring 520 and the inner surface 554 of the second coupling ring 550 may be configured such that an interference fit is formed between the first and second coupling rings 520, 550 when the first and second coupling rings are mated together.

The third step 606 may be performed by displacing the first and second shaft 510, 540 relative to one another to align the first and second couplings 520, 550, e.g. in an axial direction of the shaft assembly 500.

The first and second coupling rings 520, 550 may be displaced relative to one another by applying sufficient axial force, e.g. to the first and or second shafts 510, 540, to push the second coupling ring 550 over the first coupling ring 520 and form the interference fit between the components.

When the shapes of the outer surface 524 of the first coupling ring 520 and the inner surface 552 of the second coupling ring 550 are conical, the ease of assembling the shaft assembly 500 in this way may be improved. For example, the axial force applied in order to mate the first and second coupling rings 520, 550 may be reduced. Additionally or alternatively, the possibility of wear between the interfacing surfaces of the first and second coupling rings 520, 550 may be reduced.

In some arrangements, it may be desirable to reduce the axial force applied during the third step 606. The third step 606 may include heating the second coupling ring 550 such that the diameter of the inner surface 554 of the second coupling ring increases. The second coupling ring 550 may then be positioned about the first coupling ring 520, e.g. to align the first and second coupling rings 520, 550 in the axial direction of the shaft assembly 500.

The third step 606 may further comprise cooling the second coupling ring 550 such that the diameter of the inner surface 554 of the second coupling ring 550 reduces and the outer surface 524 of the first coupling ring 520 mates with the inner surface 554 of the second coupling ring 550. Mating the first and second coupling rings 520, 550 in this way may also reduce wear to the interfacing surfaces of the first and second coupling rings 520, 550 during assembly.

The method 600 may comprise a further step in which the axial retainer 530 is assembled into the shaft assembly 500 to restrict relative axial movements of the first and second shafts 510, 540.

Figure 7:
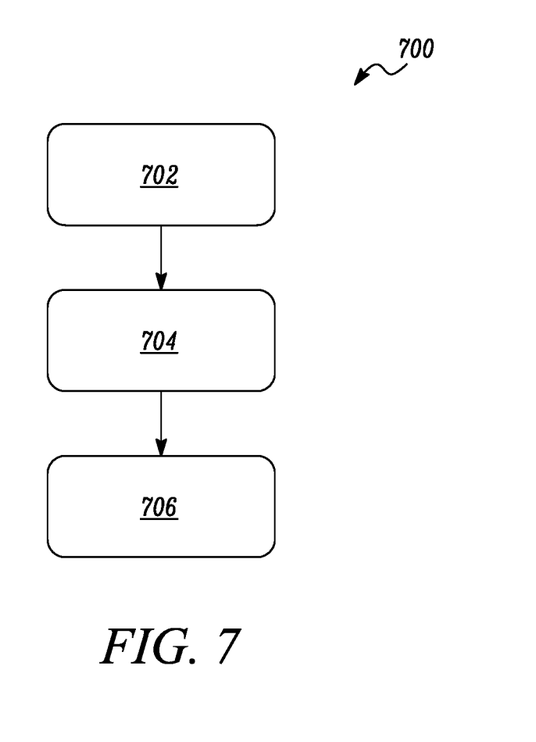
FIG. 7 is a flow chart depicting a method of reassembling the shaft assembly.

With reference to FIG. 7, if is it desirable to decouple the first and second shafts 510, 540 from one another, for example, in order to perform maintenance on the first and/or second shafts, the shaft assembly 500 may be disassembled and subsequently reassembled using a re-assembly method 700.

The method 700 comprises a first step 702, in which the joint between the first and second shafts 510, 540 is disconnected by bringing the outer surface 524 of the first coupling ring 520 out of contact with the inner surface 554 of the second coupling ring 550.

As described above, because an interference fit is formed between the outer surface 524 of the first coupling ring 520 and the inner surface 554 of the second coupling ring 550, disconnecting the joint between the coupling rings 520, 550 may cause the mating surfaces of the first and second coupling rings 520, 550 to become worn.

Areas of wear on the first and second coupling rings 520, 550 may acts as stress concentration areas, and hence, it may be undesirable for the shaft assembly 500 to be reassembled with one or more worn coupling rings.

The method 700 may comprise and second step 704, in which one or both of the first coupling ring 520 and the second coupling ring 550 is replaced. For example, the coupling rings 520, 550 may be inspected for wear, and the coupling rings exhibiting wear, e.g. having more than a threshold area and/or depth of wear on the mating surface of the coupling ring, may be replaced.

The first and/or second coupling rings 520, 550 may be replaced, by cutting through the first and/or second coupling rings and decoupling the cut through coupling ring from the first and/or second shaft. In this way, the coupling rings may be decoupled from the respective shafts without causing wear to the shafts. A replacement coupling ring may then be coupled to the shaft in the same way that the original coupling ring was coupled to the shaft, e.g. as described above.

The method 700 may further comprise a third step 706, in which the first and second shafts 510, 540 are reconnected such that the outer surface 524 of the first coupling ring 520 is mated with the inner surface 554 of the second coupling ring 550, either or both of which may be replacement coupling rings.

Because the first and second coupling rings 520, 550 are significantly smaller, less complex and less costly components than the first and second shafts 510, 540, replacing the coupling rings as part of the method 700 may be less costly than replacing or repairing the first and/or second shaft 510, 540. Furthermore, replacing the first and/or second coupling rings 520, 550 may be significantly quicker than replacing or repairing the first and/or second shafts 510, 540. Hence, by joining first and second shafts 510, 540 using the shaft assembly 500 and reassembling the shaft assembly using the method 700, the time required to disassemble and reassemble the shaft assembly 500, and the cost of disassembling and reassembling the shaft assembly 500 may be reduced compared to disassembling and reassembling the shaft assembly 100.

Figure 8:
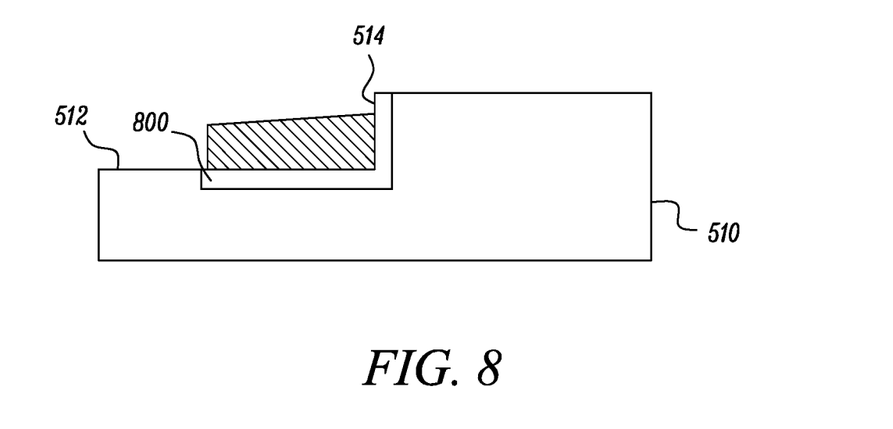
FIG. 8 is a schematic sectional view of a shaft of the shaft assembly.

With reference to FIG. 8, in some arrangements, the first shaft 510 may comprise a groove 800, e.g. an axially extending groove, formed in the surface of the shaft that couples with the coupling ring. For example, the groove 800 may be formed in an outer surface of the first shaft. FIG. 8, depicts a section through the first shaft aligned, e.g. circumferentially aligned, with a centreline of the groove 800. Grooves, such as the groove 800 may be provided at one or more discrete circumferential positions around the first shaft.

The groove 800 may be positioned on the first shaft such that the groove is aligned with the first coupling ring 520 when the first coupling ring is coupled to the first shaft 510.

The groove 800 may be for receiving a part of a cutting tool that protrudes through the first coupling ring 520 when the cutting tool is being used to cut through the first coupling ring 520 in order to remove the coupling ring from the first shaft 510, e.g. during the second step 704 of the method 700. The groove 800 may be shaped appropriately to receive the protruding part of the cutting tool, such that a clearance is provided between the cutting tool and the material of the first shaft 510 when cutting through the first coupling ring 520.

As depicted in FIG. 8, the groove 800 may extend over the axial abutment face 514 of the first shaft 510. Alternatively, the groove 800 may be confined to the outer surface 512 of the first shaft 510.

FIG. 8 shows the groove 800 formed in the outer surface 512 of the first shaft 510. However, it is equally envisaged that a groove may additionally or alternatively be formed on the inner surface 542 of the second shaft 540. The features described above in relative to the groove 800 and the first shaft 510 may apply equally to the groove formed in the second shaft 540.

In the arrangement depicted in FIGS. 5a and 5b, the first and second coupling rings 520, 550 are manufactured from the same materials as the first and second shafts 510, 540 respectively. However in other arrangements, the first and second coupling rings 520, 550 may be made from different materials.

For example in one arrangements, the second coupling ring 550 is made from the same material as the second shaft 540, or a different material, and the first coupling ring 520 is made from a softer material than the material of the second coupling ring 550. When a softer material is used to make the first coupling ring 520, the first coupling ring 520 may be worn preferentially to the second coupling ring 550 when the shafts 510, 540 are disconnected from one another, e.g. during the first step 702 of the method 700. In some arrangements, the second coupling ring 550 may be substantially unworn during the disconnection step and only the first ring 520 may be replaced, e.g. in the second step 704, before reassembling the shaft assembly.

In other arrangements, the second coupling ring 550 may be made from a softer material than the first coupling ring 520 and the second coupling ring 550 may be worn preferentially to the first coupling ring 520 when the shafts 510, 540 are disconnected.

In another arrangement, the first and second coupling rings 520, 550 are both made from a hard material, e.g. harder than the materials of the first and second shafts 520, 540, and/or the mating surfaces 524, 554 of the first and second coupling rings 520, 550 are hardened, or coated with a hard material, e.g. harder than the material of the first and second coupling rings, such that the mating surfaces of the first and second coupling rings are both substantially unworn when the first and second shafts 510, 540 are disconnected from each other. In such arrangements, it may not be necessary to replace either of the first and second coupling rings 520, 550 when the shaft assembly 500 is disassembled and reassembled, e.g. each time the shaft assembly 500 is disassembled, since the mating surfaces 524, 554 may be substantially unworn.

Figure 9A:
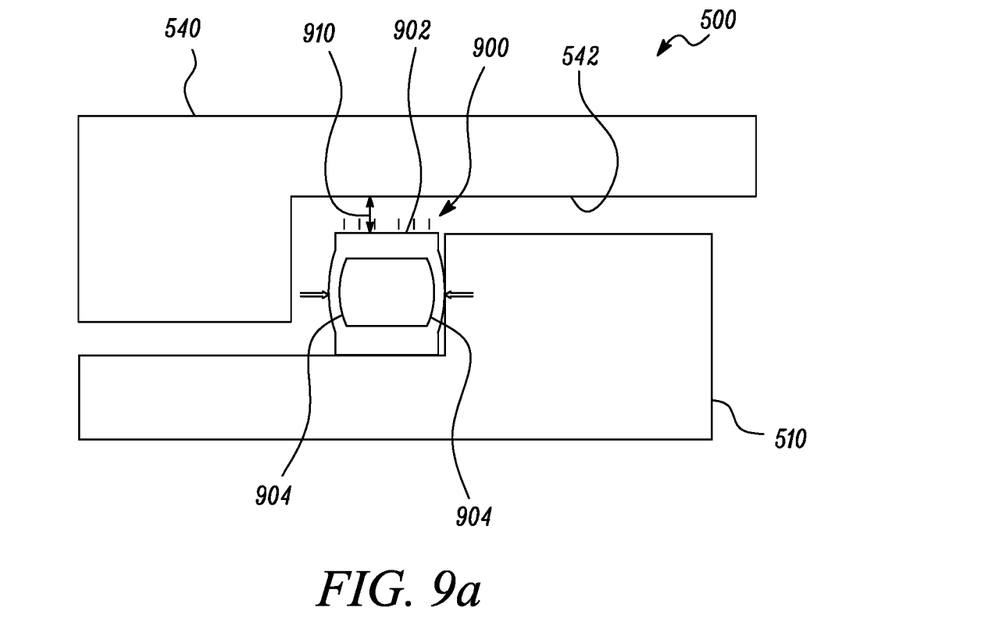
FIG. 9a is a schematic sectional view of a shaft assembly comprising an expandable coupling ring, in a disconnected configuration.
Figure 9B:
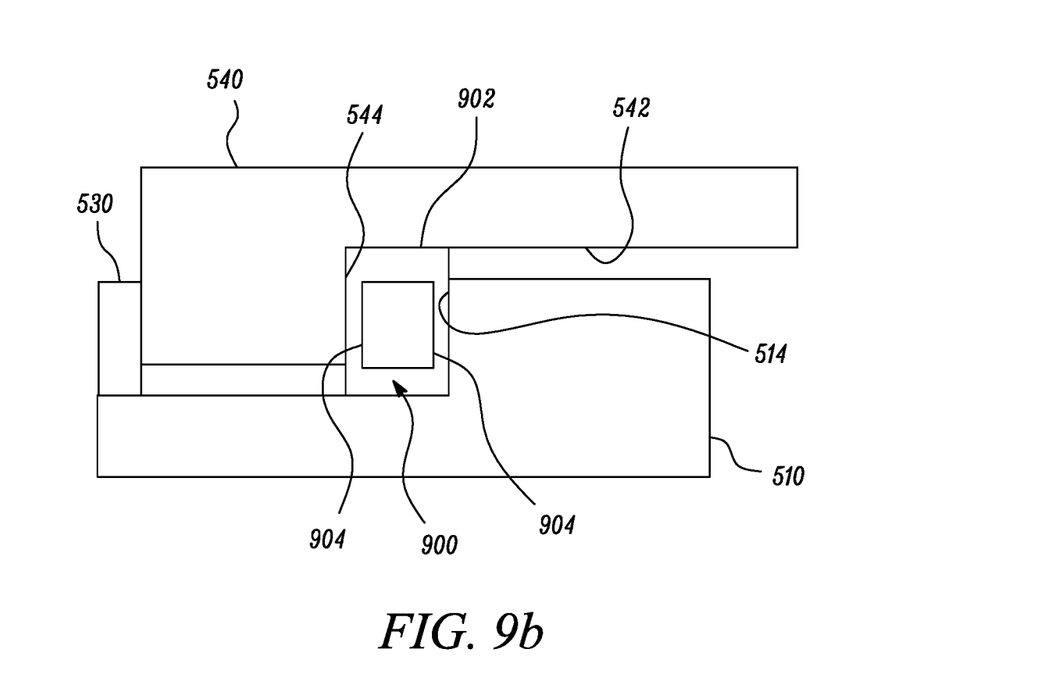
FIG. 9b is a schematic sectional view of the shaft assembly comprising the expandable coupling ring, in a connected configuration.

With reference to FIGS. 9a and 9b, in another arrangement of the present disclosure, an expandable coupling ring 900 may be provided within the shaft assembly 500 in place of the first coupling ring 520, and the second coupling ring 550 may be omitted.

The expandable coupling ring 900 is configured to selectively expand in a radial direction in order to couple the first and second shafts 510, 540 together in order to concentrically align the shafts 510, 540, e.g. by forming a spigot joint between the first and second shafts.

As depicted in FIG. 9a, when the expandable coupling ring is in an unexpanded configuration, a radial gap 910 may be present between an outer surface 902 of the expandable coupling ring 900 and the inner surface 542 of the second shaft 540.

In this condition, the first shaft 510 and expandable coupling ring 900 may be assembled with the second shaft 540, such that the first and second shafts are positioned in the desired relative axial positions.

As depicted in FIG. 9b, when the axial retainer 530 is assembled in to the shaft assembly 500 and applies an axial force to the first and second shafts 510, 540. The axial force, e.g. a compressive force, is applied to the expandable coupling ring 900 by the axial abutment faces 514, 544 of the first and second shafts 510, 540.

The compressive force applied to the expandable coupling ring 900 causes the expandable coupling ring 900 to expand in the radial direction such that the outer surface 902 of the expandable coupling ring 900 mates with the inner surface 542 of the second shaft 540. In this way, the first shaft 510 and the second shaft 540 are coupled together such that the axes of the first and second shafts 510, 540 are substantially aligned.

As depicted in FIGS. 9a and 9b, the expandable coupling ring may comprise resilient side wall portions 904, which resiliently deform under the axial load in order to change the radial height of the expandable coupling ring.

When the axial retainer 530 is disassembled from the shaft assembly 500, the compressive force is removed from the expandable coupling ring 900 and the radial height of the expandable coupling ring 900 may reduce, e.g. by virtue of the resilience of side walls 904 of the expandable coupling ring 900, such that the outer surface 902 of the expandable coupling ring no longer contacts the inner surface 542 of the second shaft 545. The first and second shafts 510, 540 can then be disassembled without the inner surface 542 of the second shaft 540 or the outer surface 902 of the expandable coupling ring 900 being worn.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A shaft assembly for a gas turbine engine, the shaft assembly comprising:
    a first shaft having an outer surface and an axial abutment face;
    a first coupling ring having an axial end face, the first coupling ring disposed around the outer surface of the first shaft, an inner surface of the first coupling ring being coupled to the outer surface of the first shaft;
    a second shaft having an inner surface; and
    a second coupling ring having an axial end face, the second coupling ring disposed around the inner surface of the second shaft, an outer surface of the second coupling ring being coupled to the inner surface of the second shaft, wherein an outer surface of the first coupling ring is configured to mate with an inner surface of the second coupling ring, such that concentricity of the first and second shafts is maintained at the shaft assembly by virtue of the mating of the first and second coupling rings;
    wherein one or both of the axial end face of the first coupling ring and the axial end face of the second coupling ring are configured to abut the axial abutment face of the first shaft when the first coupling ring and the second coupling ring mate,
    wherein the first coupling ring and the second coupling ring are configured to form an interference fit between one another when mated together.

2. The shaft assembly of claim 1, wherein the axial end face of the first coupling ring is a first axial end face of the first coupling ring and the axial end face of the second coupling ring is a first axial end face of the second coupling ring, the first coupling ring having a second axial end face and the second coupling ring having a second axial end face, wherein the second shaft comprises an axial abutment face, wherein one or both of the second axial end face of the first coupling ring and the second axial end face of the second coupling ring abut the axial abutment face of the second shaft when the first and second coupling rings mate.

3. The shaft assembly of claim 1, wherein the outer surface of the first coupling ring and the inner surface of the second coupling ring are conical, such that a shape of the inner surface of the second coupling ring corresponds to a shape of the outer surface of the first coupling ring.

4. The shaft assembly of claim 1, wherein the outer surface of the first coupling ring and the inner surface of the second coupling ring are hardened surfaces.

5. The shaft assembly of claim 1, wherein the inner surface of the second coupling ring is harder than the outer surface of the first coupling ring.

6. The shaft assembly of claim 1, wherein one or more of the first and the second shafts comprise an axial groove aligned with the first and second coupling rings respectively.

7. The shaft assembly of claim 1, further comprising an axial retainer configured to retain the first and second shafts relative to one another in an axial direction.

8. The shaft assembly of claim 1, wherein the first shaft comprises a rotor shaft for a gas turbine engine and the second shaft comprises a rotor shaft, a blade disc or a bladed disc for a gas turbine engine.

9. A shaft assembly for a gas turbine engine, the shaft assembly comprising;
    a first shaft having an outer surface;
    a second shaft having an inner surface, wherein a portion of the first shaft is received inside of the inner surface of the second shaft;
    an expandable coupling ring disposed around the outer surface of the first shaft and arranged between the outer surface of the first shaft and the inner surface of the second shaft, wherein the expandable coupling ring is configured to selectively expand in a radial direction in order to couple to the first and second shafts together such that concentricity of the first and second shafts is maintained at the shaft assembly by the expandable coupling ring,
    wherein an outer surface of the expandable coupling ring mates with the inner surface of the second shaft when expanded.

10. The shaft assembly of claim 9, wherein the shaft assembly further comprises an axial retainer configured to apply an axial force to the expandable coupling ring, wherein the expandable coupling ring is configured to expand in the radial direction under an action of the axial force.

11. A method of assembling a shaft assembly, the shaft assembly comprising:
    a first shaft having an outer surface;
    a second shaft having an inner surface, wherein the method comprises:
    coupling an inner surface of a first coupling ring to the outer surface of the first shaft such that the first coupling ring is disposed around the outer surface of the first shaft;
    coupling an outer surface of a second coupling ring to the inner surface of the second shaft such that the second coupling ring is disposed around the inner surface of the second shaft, wherein one or more of the first shaft and the second shaft comprise an axial groove aligned with the first coupling ring and the second coupling ring respectively; and
    mating an outer surface of the first coupling ring with an inner surface of the second coupling ring such that concentricity of the first and second shafts is maintained at the shaft assembly.

12. The method of claim 11, wherein the outer surface of the first coupling ring and the inner surface of the second coupling ring are conical, such that the inner surface of the second coupling ring corresponds to the outer surface of the first coupling ring, wherein the step of mating the outer surface of the first coupling ring with the inner surface of the second coupling ring comprises:

displacing the first and second shafts relative to one another in an axial direction.

13. A method of re-assembling a shaft assembly, wherein the shaft assembly comprises:
   a first shaft having an outer surface;
   a first coupling ring disposed around the outer surface of the first shaft, wherein an inner surface of the first coupling ring is coupled to the outer surface of the first shaft;
   a second shaft having an inner surface; and
   a second coupling ring disposed around the inner surface of the second shaft, wherein an outer surface of the second coupling ring is coupled to the inner surface of the second shaft, and wherein an outer surface of the first coupling ring is mated with an inner surface of the second coupling ring to form a joint between the first and second shafts, wherein the method comprises:
   disconnecting the joint between the first and second shafts by bringing the outer surface of the first coupling ring out of contact with the inner surface of the second coupling ring;
   replacing one or both of the first coupling ring and the second coupling ring; and
   reconnecting the first and second shafts such that the outer surface of the first coupling ring is mated with the inner surface of the second coupling ring.

14. The method of claim 13, wherein one or more of the first and the second shafts comprise an axial groove aligned with the first and second coupling rings, wherein the step of replacing one or both of the first coupling ring and the second coupling ring comprises cutting through the first and second coupling rings being replaced, and wherein a cutting tool used to cut through the one or more of the first and second coupling rings passes though the axial groove during the cutting operation.

15. A gas turbine engine for an aircraft comprising:
   an engine core comprising a turbine, a compressor, and a core shaft connecting the turbine to the compressor;
   a fan located upstream of the engine core, the fan comprising a plurality of fan blades; and
   a gearbox that receives an input from the core shaft and outputs drive to the fan so as to drive the fan at a lower rotational speed than the core shaft, wherein the gas turbine engine comprises a shaft assembly according to claim 1.

16. The gas turbine engine according to claim 15, wherein:
   the turbine is a first turbine, the compressor is a first compressor, and the core shaft is a first core shaft;
   the engine core further comprises a second turbine, a second compressor, and a second core shaft connecting the second turbine to the second compressor; and
   the second turbine, second compressor, and second core shaft are arranged to rotate at a higher rotational speed than the first core shaft.

* * * * *